United States Patent Office 3,039,716
Patented June 19, 1962

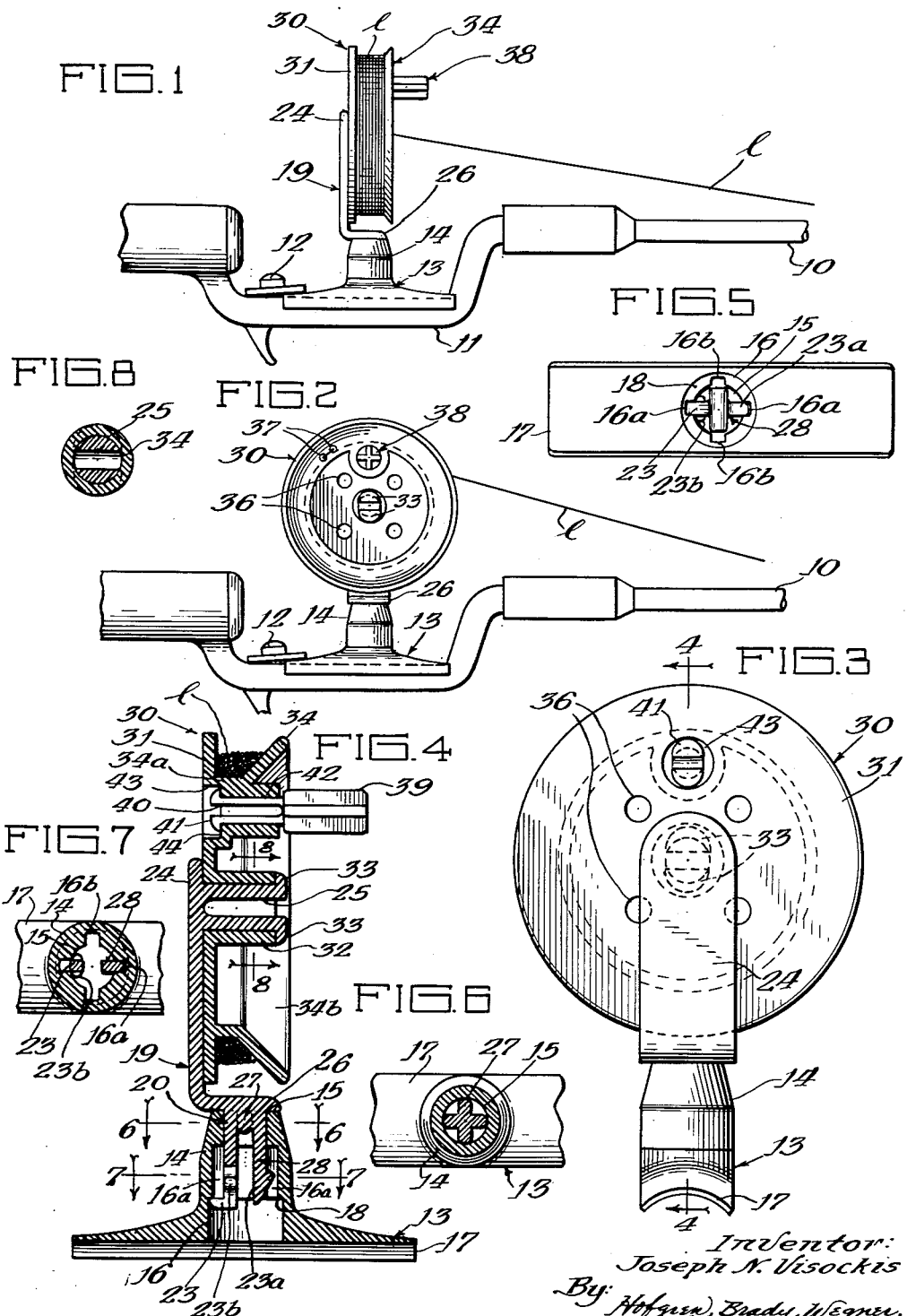

3,039,716
FISHING REEL
Joseph N. Visockis, 5204 S. Lorel Ave., Chicago, Ill.
Filed Mar. 1, 1960, Ser. No. 12,023
8 Claims. (Cl. 242—84.2)

This invention relates to fishing reels, and is particularly concerned with a spinning reel of simple four-part construction.

The primary object of my invention is to provide a very inexpensive reel of simple four-part construction which may be readily assembled and disassembled, and in which there are no separate fasteners, bearings, or the like.

Another object of the invention is to provide a reel which is especially adapted for use by children, and which may be fastened to any sort of rod or pole, including a bamboo pole or branch of a tree.

A further object of the invention is to construct a reel with simple parts which may be formed by plastic molding.

The invention is illustrated in a preferred embodiment in the accompanying drawings, in which:

FIG. 1 is a fragmentary side elevational view of a rod showing my new and improved reel in a position for casting;

FIG. 2 is a view similar to FIG. 1 with the reel in the position for retrieving line;

FIG. 3 is an enlarged rear elevation showing the spool, spindle frame and base;

FIG. 4 is a vertical sectional view taken on line 4—4 of FIG. 3;

FIG. 5 is a plan view of the mounting base removed from the fishing rod;

FIG. 6 is a horizontal sectional view taken on line 6—6 of FIG. 4;

FIG. 7 is a horizontal sectional view taken on line 7—7 of FIG. 4; and

FIG. 8 is a vertical sectional view taken on line 8—8 of FIG. 4.

Referring to the drawings, the device of the present invention includes, generally, a reel mounting base 13 having an integral upright hollow boss 14; a spindle frame 19 having a laterally extending integral spool support 25 and an integral support swivel 20 rotatably engaged with boss 14; and a unitary spool 30 rotatably mounted on spool support 25, having a hollow handle boss 42 in which a handle 38 is rotatably positioned.

Referring more particularly to FIGS. 1 and 2, a fishing rod, referred to generally by reference numeral 10, has a reel support 11, and a clamp 12 by means of which a reel may be secured to support 11 of the rod 10.

Base 13 of the reel comprises an elongated arcuate flange 17, and an upright hollow boss 14 substantially at the center of flange 17, said boss having a round bore 15 which is best seen in FIGS. 5 and 6 to connect with an enlarged recess 16 on the underside of flange 17 to form a shoulder 18. The recess 16 is provided with two opposed hollows 16a which are on a diameter parallel to the long axis of flange 17, and opposed hollows 16b which are 90° from hollows 16a, said hollows 16a and 16b providing integral detent elements.

A spindle frame, indicated generally at 19, has an elongated upright mid-portion 24, a laterally extending integral spool support 25 near its upper end, and a base 26 at right angles to the mid-portion with an integral bearing member 20 rotatably disposed in bore 15.

Swivel 20 has a cruciform upper portion 27 and a split shaft or bifurcated lower portion 28 having arms 28a and 28b, the cruciform portion 27 being freely rotatable within bore 15 while the split shaft, or bifurcated portion 28 projects into recess 16 and has a first lug 23 extending radially outwardly at its lower end and making a snap fit beneath shoulder 18 to maintain the rotatable engagement.

Lug 23 has bumps 23b which prevent it from seating in the hollows 16a or 16b; while a second lug 23a is relatively narrow and seats in a hollow 16a or 16b to index the reel either parallel or transverse to the long axis of flange 17. Split shaft portion 28 of support member 20 is sufficiently resilient that by manually compressing the ends of shaft 28 the member 20 may be slipped either into or out of engagement with bore 15; and lugs 23 and 23a have arcuate edges which, when shaft 28 is compressed, slidably engage bore 15, and beveled cam faces to facilitate insertion.

A specially shaped unitary spool, indicated generally at 30, has a bearing disc 31 with an axial hollow bearing hub 32 by means of which it is rotatably mounted on spool support 25 of spindle frame 19 with one face of disc 31 against the surface of mid-portion 24 of said frame. Said support member 25 has a split shaft construction with radial lugs 33 at its ends which make a snap engagement over the end of hub 32 to retain the spool 30 on the spindle frame 19. Surrounding hub 32 is a laterally extending cup-like line carrier 34 which includes an annular line-carrying base 34a and an inclined annular line-confining flange 34b.

A plurality of ports 36 mutually circumferentially aligned in element 31 inboard of the line carrier of spool 30 provide space for hook storage. A pair of spaced holes 37 adjoining the periphery of element 34 provide means for tying the free end of a line 1 to spool 30.

A handle 38 having a cruciform finger piece 39 and a split shaft portion 40 is rotatably mounted in a hollow handle boss 42 of spool 30 radially inboard of the line carrier 34 of said spool. The bore of hollow boss 42 connects with a counterbore 43 in bearing disc 31 to form a shoulder 44, and radial lugs 41 on the split shaft 40 of the handle seat in counterbore 43 and make a snap fit behind shoulder 44.

Referring now to the use and operation of the described reel in casting the reel is in the position shown in FIG. 1, with the spool transverse to the rod. The cruciform portion 27 of support member 20 is rotatable in bore 15; and lug 23a, engaged in one of the hollows 16a of recess 16, provides sufficient force to index spindle frame 19 and spool 30 to this position. When it is desired to retrieve the line, the spindle frame 19 and spool 30 are manually turned 90° to the position shown in FIG. 2. The turning pressure compresses split shaft 28, allowing lugs 23 and 23a to travel along opposite faces of recess 16 until lug 23a snaps into position in one of the hollows 16b, locking spool 30 parallel to the rod for retrieving the line.

The foregoing detailed description is given for clearness of understanding only and no unnecessary limitations are to be understood therefrom, as modifications will be obvious to those skilled in the art.

I claim:

1. In a fishing reel, in combination: a mounting base adapted to be secured to a fishing rod, said base having a long axis to extend longitudinally of the rod; an integral upright boss on the base, said boss having a bore in its upper portion and a recess beneath said bore and connecting therewith to provide a shoulder, there being radial hollows at 90° intervals about the periphery of said recess; a spindle frame rotatably seated in said boss, said frame including a bearing member having a split shaft lower section affording arms which have a radial lug at their extremities, one of said lugs extending outwardly beneath said shoulder and one of said lugs engaging one of the hollows in said recess, said split shaft portion being sufficiently resilient that it may be rotated to position said last named one of said lugs in any one of said hollows, and that it may be removed through said bore.

2. A fishing reel as defined in claim 1 wherein said bearing member has a cruciform upper section rotatably positioned within said bore.

3. The combination of claim 1 in which one arm has a lug extending beneath the shoulder, said lug being wider than said hollows so as to ride over them, and the other arm has a lug which engages said hollows.

4. The combination of claim 3 in which the lug on said other arm is above the shoulder.

5. In a fishing reel, in combination: a mounting base adapted to be secured to a fishing rod, said base having an integral upright boss with a circumferential shoulder and integral, radially extending detent elements at 90° intervals; and a one-piece spool receiving spindle frame rotatably mounted on said boss, said spindle frame including an integral bearing member having a bifurcated lower portion with resilient arms, a radially extending lug on one of said arms making a snap fit to slidably engage beneath said shoulder, and means on one of said arms selectively resiliently engageable with said detent elements, the resilience of said arms and the shape of said last named means being such that the spindle frame may be rotated to engage said last named means with any one of said detent means, and said arms may be flexed to disengage said radially extending lug from said shoulder for removal of the spindle frame from the base.

6. The combination of claim 5 in which the boss is hollow with a bore extending entirely therethrough, the shoulder is on the wall of said bore, and the bearing member extends into said bore.

7. The combination of claim 5 in which the shoulder has a surface perpendicular to the axis of rotation of the bearing member, and the radially extending lug on one of the resilient arms has a surface substantially parallel to the shoulder.

8. In a fishing reel, in combination: a mounting base adapted to be secured to a fishing rod, said base having an integral upright hollow boss which is open top and bottom and has an internal circumferential shoulder intermediate its ends and integral radially extending detent means at 90° intervals; and a spool receiving spindle frame rotatably seated in said boss, said frame including an integral bearing member having a split shaft lower section affording arms one of which has a radial lug at its extremity extending outwardly and engaged beneath said shoulder, and one of said arms having means selectively engageable with any one of said detent means, said split shaft portion being sufficiently resilient that it may be rotated to engage said selectively engageable means with said detent means and that said arms may be flexed to disengage said lug from the shoulder and withdraw the bearing member from the boss.

References Cited in the file of this patent

UNITED STATES PATENTS

| | | |
|---|---|---|
| 434,295 | Richardi | Aug. 12, 1890 |
| 2,232,253 | Maynes | Feb. 18, 1941 |
| 2,309,146 | Whistler | Jan. 26, 1943 |
| 2,363,533 | King | Nov. 28, 1944 |
| 2,367,214 | Hedge | Jan. 16, 1945 |
| 2,531,816 | Homoky | Nov. 28, 1950 |
| 2,580,777 | Hewlett | Jan. 1, 1952 |
| 2,581,306 | Slotterback | Jan. 1, 1952 |
| 2,705,601 | Clickner | Apr. 5, 1955 |
| 2,865,071 | Clemens | Dec. 23, 1958 |
| 2,926,450 | Ritchie | Mar. 1, 1960 |

FOREIGN PATENTS

| | | |
|---|---|---|
| 581,770 | France | Oct. 2, 1924 |